United States Patent [19]
Oda et al.

[11] Patent Number: 5,593,175
[45] Date of Patent: Jan. 14, 1997

[54] LEG APPARATUS FOR THE MAGNETICALLY LEVITATED VEHICLE

[75] Inventors: Kazuhiro Oda, Murayama; Masayoshi Azakami; Hideyuki Takizawa, both of Kokubunji; Fumio Iwamoto, Takatsuki; Shoji Iwai, Akashi, all of Japan

[73] Assignees: Railway Technical Research Institute, Tokyo; Sumitomo Precision Products Company Limited, Hyogo, both of Japan

[21] Appl. No.: 445,503

[22] Filed: May 22, 1995

Related U.S. Application Data

[63] Continuation of Ser. No. 215,473, Mar. 21, 1994, abandoned, which is a continuation of Ser. No. 992,126, Dec. 17, 1993, abandoned.

[30] Foreign Application Priority Data

Dec. 17, 1991 [JP] Japan .................. 3-353805
Feb. 24, 1992 [JP] Japan .................. 4-73363
Dec. 15, 1992 [JP] Japan .................. 4-354416
Dec. 15, 1992 [JP] Japan .................. 4-354417

[51] Int. Cl.$^6$ .................. B60G 11/26
[52] U.S. Cl. .................. 280/704; 180/209; 104/281
[58] Field of Search .................. 180/209; 280/704, 280/43; 104/281; 244/102 R, 102 A

[56] References Cited

U.S. PATENT DOCUMENTS

| | | | |
|---|---|---|---|
| 4,770,372 | 9/1988 | Ralph | 244/102 R |
| 5,058,916 | 10/1991 | Hicks | 280/704 |
| 5,356,162 | 10/1994 | Dorrien | 267/227 X |

FOREIGN PATENT DOCUMENTS

| | | | |
|---|---|---|---|
| 0173608 | 9/1986 | European Pat. Off. | 104/281 |
| 0566966 | 10/1993 | European Pat. Off. | 280/704 |
| 4126055 | 9/1990 | Japan | 104/281 |
| 4261305 | 2/1991 | Japan | 104/281 |
| 2134052 | 8/1984 | United Kingdom | 280/704 |
| 9105676 | 5/1991 | WIPO | 280/704 |

*Primary Examiner*—Christopher P. Ellis
*Attorney, Agent, or Firm*—Watson Cole Stevens Davis, P.L.L.C.

[57] ABSTRACT

In a leg apparatus with which a supporting wheel for the magnetically levitated vehicle can be lifted up and down freely, a supporting wheel is positioned and hung by a swing arm and a lifting actuator. Usage of only the lifting actuator flat spring having a damper and coil spring or a combination thereof offer a buffer-supporting to enhance better comfortable feeling of riding. The leg can be completely retracted with a short stroke by a contracting action of the lifting actuator having the internal lock. Moreover the vehicle height can be adjusted. The leg apparatus is also designed and constructed in such a way that a damper or spring is installed inside the preventive wall against fire or foreign obstacles. The shock caused on the wheel when a cruising speed is changed from a high speed to a low speed can be mechanically absorbed by coil spring and damper, or coil spring, the flat spring or damper which is provided horizontally and is connected through the connecting such as the bell crank or the like, so that the operational friction force can be minimized when compared to the conventional type of the apparatus using only damper, hence the comfortable feeling of riding is enhanced.

4 Claims, 13 Drawing Sheets

LEG APPARATUS FOR THE MAGNETICALLY LEVITATED VEHICLE

CROSS REFERENCE TO RELATED APPLICATIONS

This application is a continuation application of Ser. No. 08/215,473, filed Mar. 21, 1994, now abandoned, which was a continuation-in-part of application Ser. No. 07/992,126, filed Dec. 17, 1992, now abandoned.

BACKGROUND OF THE INVENTION

This invention relates to an improvement of a supporting leg apparatus (hereinafter it is merely referred as a leg apparatus) which enables by means of the support wheels installed in a magnetically levitated vehicle to expand or contract freely. The improvement has been achieved, particularly aiming at the improvement of the comfortable feeling of riding, by hanging the support wheels at a certain position defined by a swing arm and a lifting actuator, and by supporting said support wheels through the action of a buffer means of the lifting actuator having a damper and a coil spring. Furthermore, with the improved lift apparatus, the support wheels can be completely retracted within a short stroking under a contraction action of the lifting actuator in which an internal lock is equipped, so that the wheel height of the vehicle can be adjusted. Moreover, the improved leg apparatus for the magnetically levitated vehicle enables the damper and coil spring to be stored inside the preventive wall which protects them from the firs and collision with foreign obstacles.

With a magnetically levitated vehicle system, the ground coil is arranged on the ground for purposes of levitation and propulsion functions, and the electrical magnets arranged on the vehicle move by forming a continuously moving magnetic field being corresponded to successive excitation of the propulsion coils. At the same time, by moving the electrical magnets on the vehicle, an inductive current is generated in the floating coil on the ground by which the magnetic field is repulsed; and this in turn results in floating vehicle.

However, only when a sufficient speed is attained by the vehicle does the inductive magnetic levitating force generate an amount of power which is enough to support the full weight of the vehicle; as a result additional wheels are required to support the vehicle at a low cruising speed.

Such a supporting apparatus with wheels should be expected to operate the vehicle comfortably when the vehicle is at rest or at necessitated low speed range; while in case of high speed range, it should be retracted and stored within the vehicle body. Furthermore, when the wheels are needed, they should be extended from the vehicle body and a certain mechanism is required to absorb the shock while the wheels are in an extending position.

A prior art leg supporting apparatus employed in a magnetically levitated vehicle (Tokkai-Sho No. 63-212165) disclosed a structure in which wheels were supported by means of a trailing arm on which a damper was installed to act as a shock absorber. Furthermore, a lift cylinder was installed at a pivot side of the damper to retract the wheels when the damper and the trailing arm are lifted.

With a structure of the aforementioned support wheels, an impact generated while the wheels are expanding is supposed to be absorbed through a damper on the trailing arm. However, since the damper utilized in the structure is principally an oil/air type, a packing seal is employed on the piston for leak-proof of oil or air. Consequently, the friction caused by the seal is high while the piston is in an operation stage, so that a proper movement has a tendency to be delayed. As a result, further improvement in riding comfort cannot be achieved.

Moreover, in the U.S. Pat. No. 5,058,916 an apparatus for supporting an expandable and contractible base wheel which had been basically used for a highway or railroad is disclosed. The apparatus is constructed by connecting one end of a trailing arm that is provided at a shaft of the wheels to a flexible cable of a rubber air spring as a first lifting means and by providing a buffer device between the air spring as the first lifting means and the trail arm. By means of the aforementioned construction, the wheels can be moved vertically by supplying or exhausting a pressurized air to the air spring of the first lifting means and the air spring of the second lifting means.

The apparatus for supporting base wheel disclosed in U.S. Pat. No. 5,058,916 requires two lifting means, and this in fact represents a complicated structure. The ride is not expected to be comfortable because of the existance of a hysteresis action that is caused by the air spring. Moreover, fractures of the rubber air spring or the flexible cable could occur. Hence it is difficult to adopt the apparatus for use as a leg supporting for a high speed running magnetically levitated vehicle.

Furthermore, UK Patent No. 2,134,052 discloses a supporting apparatus for an amphibian vehicle. With this supporting apparatus, one end of the lever arm which is rotatable along a rotating shaft installed to a vehicle bracket is supported rotatably to a driving shaft of the cylinder that is connected to the vehicle bracket at one end. Furthermore, the other end of lever arm is provided rotatably to a rotating shaft through a buffer device. Moreover of the driving shaft, driven by pressure generated from supplied oil to the cylinder, rotates the lever arm along the rotating shaft, and this consequently causes the wheels to move in vertical direction.

The apparatus for a base wheel (disclosed in UK Patent No. 2,134,052) requires many components and four plates to be installed to the main vehicle, and this results in making the device structurally a complicated one. Besides, the buffer device is constructed to have an enclosed pressurized air which tends to exhibit a large hysteresis; hence the ride is not expected to be comfortable. This is a technical drawback associated with the patent.

Furthermore, since passengers get on and off from the magnetically levitated vehicle while it is at rest, the leg apparatus for supporting wheels should be adjusted so that it maintains an even level for the accommodation of a certain height of a platform.

When the vehicle weight is altered after the completion of manufacturing the vehicle or due to demand to change the vehicle height due to unexpected changes in number of passengers, an improved leg apparatus is needed to correspond easily to such occasional fluctuations. Moreover, to the best knowledge of the present applicants, there is no single leg apparatus proposed which is designed and constructed to maintain the original function thereof even under any of the expected accidental circumstances including collision of foreign obstacles from the road against the leg apparatus, which leads to damage of the spring or other components while cruising at a low speed, or catching fire due to excess heat on the braking device that results from the collision of flammable foreign obstacles.

OBJECTS AND SUMMARY OF THE INVENTION

It is, therefore, an object of this invention to provide an improved leg apparatus for a magnetically levitated vehicle with which the original function required to the supporting wheels is maintained to offer better comfortable feeling of riding, an actuator is being operated with a short stroke while the wheels are retracted to be stored, the wheels can be expanded or contracted in a narrow storage space, the vehicle height can be adjusted, and damage or fire can be prevented.

The leg apparatus for the magnetically levitated vehicle according to the present invention is constructed by a hanging means for defining a position comprising a swing arm connecting a first shaft supporting component to a shaft supporting component and connecting a second shaft supporting to a base wheel, and by an actuator for lifting the wheels which connects in a rotatable manner to said base wheel on one side and connects to one side of said shaft components at its other end. The leg apparatus is furthermore constructed with a mechanical buffer means that is provided between the base wheel and the hanging means for positioning purpose. With the constructions described in above, the supporting wheels can be completely retracted with a short stroke through a provided contraction action of a lifting actuator after a release of locking of the lifting actuator having an internal lock which operates during an expansion mode. Furthermore, with the improved leg apparatus, a shaft supporting location of the top portion of the lifting actuator can be easily changed to adjust the vehicle height through various mechanical mechanisms provided at the top portion of the lifting actuator.

Furthermore, a basic construction of this improved leg apparatus for the magnetically levitated vehicle is to define a position by hanging the swing arm and the lifting actuator that had the internal lock mechanism. Moreover the following constructions that act as mechanical buffer means are provided;

1) a mechanism to define a position by a rod constructed with the wheel shaft supporting portion of said swing arm and oil pressure cylinder provided between upper and lower base wheels;

2) a mechanism by which it enables the shaft supporting portion of the wheels which is hung by the swing arm to lift upward or downward through an expandable and contractible lifting actuator provided at one end portion of the connecting components for bell crank or the like, to provide a coil spring which includes a damper on a same shaft thereof between the other end of said connecting components and a pivot shaft portion of said swing arm, and to act in a manner designed to absorb impact caused by dropping the wheels through connecting components such as locked lifting actuator, bell crank or the like;

3) a mechanism to perform a buffer-support by connecting the upper portion of the lifting actuator to a flat spring provided vertically at the top and bottom portions of the shaft portion of the swing arm through the connecting portion of the bell crank or the like;

4) a mechanism to perform as a buffer-support by virtue of a flat spring which is located horizontally and connected through the connecting portions of the bell crank or the like at the upper end of the lifting actuator;

5) a mechanism to perform as a buffer-support by means of a damper which is provided horizontally and is connected to the upper end of the lifting actuator through a connecting portion of the bell crank or the like of the lifting actuator;

6) a mechanism to perform and/or buffer-support through connecting portions of the link arm or the like by providing a ball crank type having component between the bottom end of the lifting actuator and the shaft portion supporting the base wheel of the swing arm; said bell crank type hanging component is designed in such a manner that it is composed of a flat spring at one end and a swing arm at the other end; and 7) a mechanism to perform as a buffer-support by connecting the space between the bottom and of the lifting actuator and the shaft supporting portion of the base wheel of the swing arm through the bell crank type hanging component which has a flat spring at one end and a lever at the other end.

With an improved leg apparatus for magnetically levitated vehicle constructed with the aforementioned mechanisms, as expected shock that might occur due to the expanding action of the wheels during changing from a high speed to a low speed cruising can be absorbed after positioning by the lifting actuator, by the coil spring, flat spring, and damper which are connected horizontally through connecting components such as a coil spring, damper, bell crank or the like. As a result, a frictional force generated by a conventional type damper system can be eliminated, so that a comfortable feeling of riding can be improved and enhanced.

Furthermore, this improved leg apparatus for the magnetically levitated vehicle employs a mechanism for adjusting the vehicle height. The described adjusting mechanism possesses the following advantages.

1) Since a barrel head of the lifting actuator is pivoted at one end of the connecting components such as a lever joint or the like and the other end thereof is pushed under an oil pressure cylinder, a supporting height can be easily changed only by changing the pushing direction, so that an adjustment of the vehicle height can be achieved very easily.

2) With the improved structure of the leg apparatus, one end of the connecting components including bell crank, lever joint or the like is connected to the distal end portion of the flat spring so that the vehicle height can be easily changed by means of supporting said connecting components rotatably to the base wheel, and changing the pivoting position for these connecting components. Hence the supporting height for the lever joint or the like can be arbitrarily changed by simply changing the pushing stroke of the connecting components such as the lever joint or the like. As a mechanism by which adjusting the pushing stroke of the connecting components including the lever joint or the like can be attained, a mechanical adjustment mechanism or an oil pressure type adjustment mechanism can be arbitrarily employed. By the action of the mechanical adjustment mechanism, as will be described later in embodiment sections, a bolt which is threaded on both sides from its center is screwed between two divided rods, so that the rod length can be adjusted by virtue of a rotating movement. On the other hand, by the oil pressure type adjustment mechanism, one side of the divided arm is used as a cylinder barrel while the other side thereof is utilized as a piston head, so that in turn the arm length can be adjusted by changing the pressurized oil quantity.

3) Compressive force, namely spring constant, of the oil spring provided horizontally is designed to be adjustable, so that the upper end position of the lifting actuator, which is buffer-supported through connecting components such as a lever joint or the like, can be changed according to a rotating angle of said connecting components. Hence the vehicle height can be adjusted.

4) The length of the supporting portion for the damper provided horizontally is being designed to be adjustable. The upper end position of the lifting actuator which is buffer-supported through the action of the connecting components including a lever joint or the like can be changed according to a rotating angle of said connecting components. Hence, the vehicle height can be adjusted.

5) The upper link arm which is axially supported to the vehicle and the lower link arm which is connected to the lifting arm of the bell crank type hanging components are pivoted to a distal end portion of the lifting actuator which is axially supported to the vehicle.

The upper and lower link arms and actuator will be fixed in a T-shape manner when the lifting actuator is expanding, so that high load can be supported by axial force of upper and lower link arms. Moreover, the vehicle height can be adjusted by providing a length controlling mechanism for the arm at the lower link arm portion.

DETAILED DESCRIPTION OF THE PREFERRED EMBODIMENTS

Embodiment 1

Figure 1:
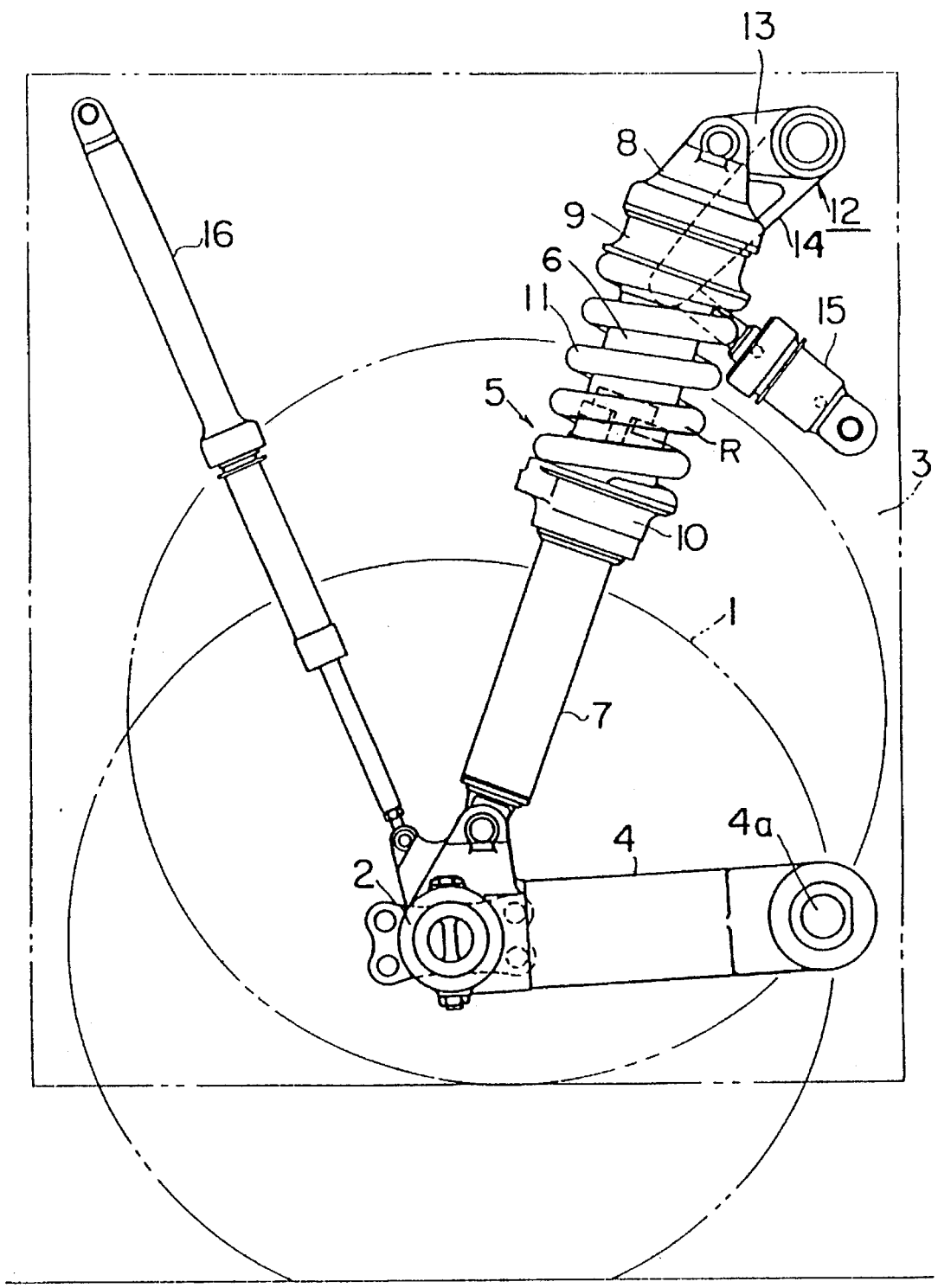
FIG. 1 is an illustration showing a side view of the vehicle according to the first embodiment of the leg apparatus for the magnetically levitated vehicle of the present invention.
Figure 2:
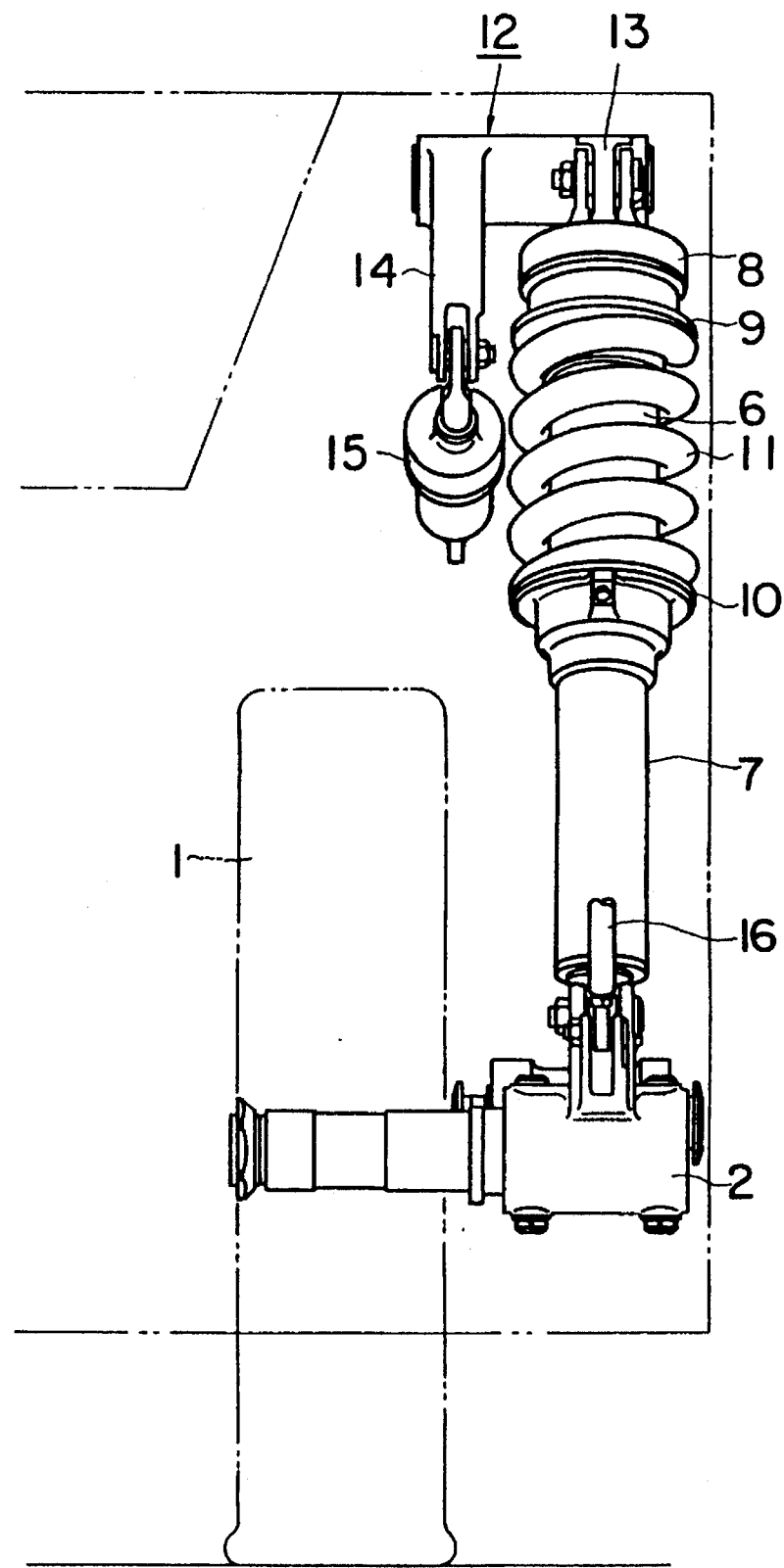
FIG. 2 is an illustration showing a front view of the leg apparatus of FIG. 1.

In the leg apparatus shown in FIGS. 1 and 2, a wheel 1 is provided at the distal end of a shaft supporting portion 2. The wheel is hung and supported from a supporting wall on a base wheel 3 side through a swing arm 4 pivoted by a bracket (not shown), a lifting actuator 5 which is provided between the shaft supporting portion 2 and a base wheel located at the back side of the shaft supporting portion that is wound by a coil spring 11, and an expandable and contractible damper 16 designed to be located between the shaft supporting portion 2 and a base wheel located at the front side of the shaft supporting portion. Namely, the wheel 1 is positioned and hung by the swing arm 4 and the lifting actuator 5 having the coil spring 11, and buffer-supported by the damper.

The damper 16 cited above is constructed to have an oil pressure cylinder. The lifting actuator 5 is constructed with the oil pressure cylinder being attached to an internal lock R. A lock pin and lock segment are provided at an engaging distal end of a piston rod 7 which is engaged into a barrel, so that the internal lock R is meant to operate when the piston rod 7 is extended at its maximum stroke.

Moreover, the barrel 6 is engaged into a barrel head 8 which is connected to a short lever 13 of a lever joint 12 pivoted to the supporting wall found on a base wheel side. The coil spring 11 is wounded around the outer periphery of the barrel 6 between a spring washer 9 which is located at the lower end of the barrel head 8 and a spring washer 10 provided at the lower end of the barrel 6.

The lever joint 12 is pivoted to the supporting wall on a side of base wheel 3. The barrel head 8 is connected to the short lever 13 and a piston rod of oil pressure cylinder 15 for vehicle height adjustment pivoted through a bracket (not shown) is designed to be connected to a long lever 14.

With said leg apparatus according to the aforementioned structures for the first embodiment, the leg can be extended by actions of expanding the piston rod 7 of the lifting actuator 5 through supplying pressurized oil to the side of barrel head 8 until the completion of the leg extension is attained, as seen in FIG. 1 in which the internal lock R operates at the maximum length of the extension. On the other hand, by contracting the piston rod 7 by means of releasing the internal lock R that operates through supplying the pressurized on to the washer 10 side for the storage, the wheel 1 can be completely retracted. Hence the wheel 1 can be easily and securely lifted outward and inward.

Furthermore, since the barrel head 8 which represents the a top portion of the lifting actuator 5 is pushed by virtue of the oil pressure cylinder 15 through the lever joint 12, the height for the supporting position can be arbitrarily changed only in case of changing the pushing direction, so that the vehicle height can easily be adjusted.

By a construction in which the wheel 1 is positioned and hung by the swing arm 4 and the lifting actuator 5 which is declined backward, shock caused by the wheel when a running speed is changed from a high speed to a low speed can be absorbed by the coil spring 11 of the lifting actuator 5. Moreover, micro-vibration can also be absorbed by means of the damper 16 that is in the form of an oil pressure cylinder, thus performing an excellent shock absorbing capability which in turn ride of improved comfort.

Embodiment 2

Figure 3:
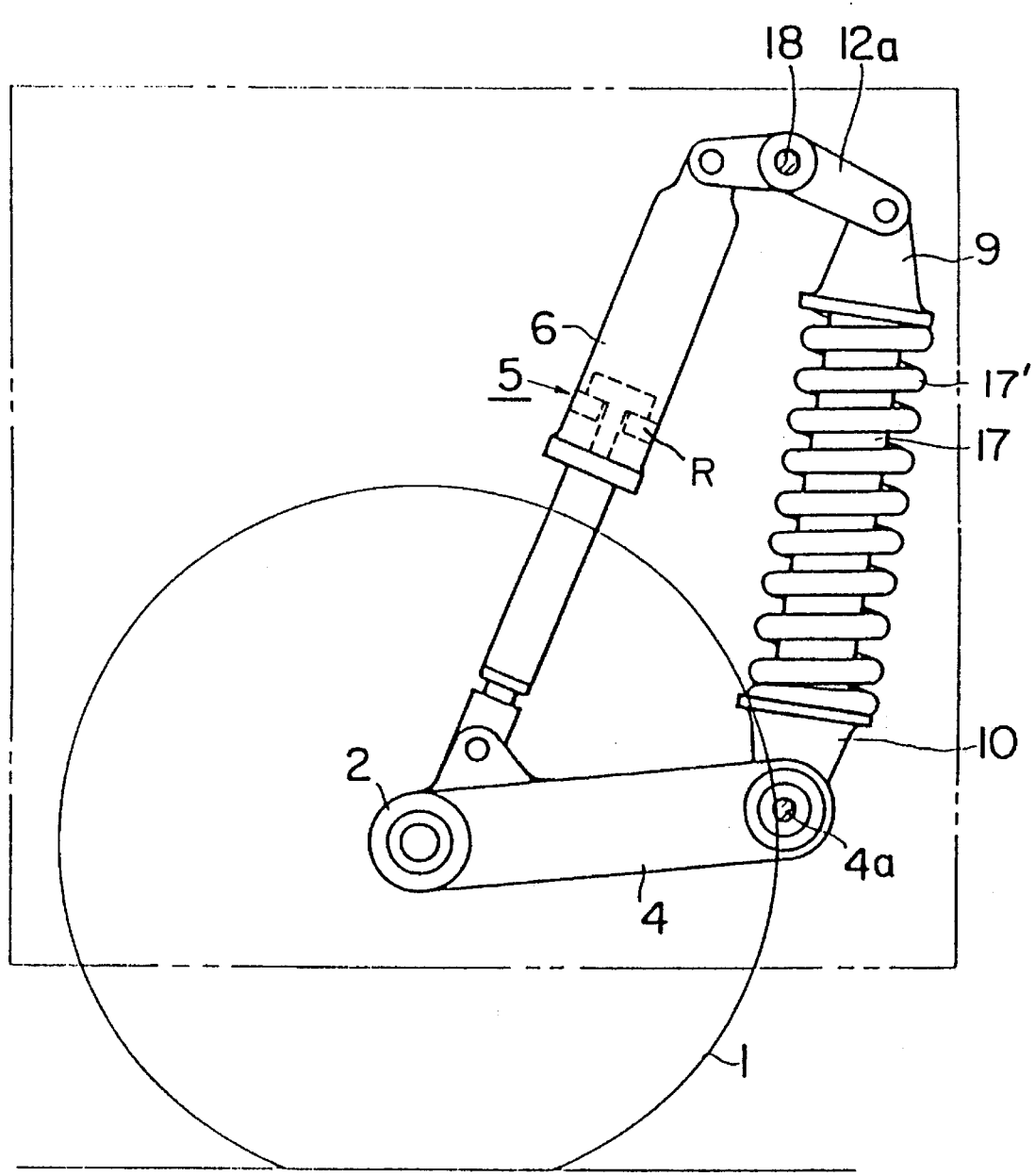
FIG. 3 is an illustration showing a side view of the vehicle according to the second embodiment of the leg apparatus for the magnetically levitated vehicle which is constructed to be using a coil spring and damper of the present invention.

The leg apparatus shown in FIG. 3 is composed of the swing arm 4, a bell crank 12a, the lifting actuator 5 and a coil spring 17' wound around the outer periphery of the oil pressure cylinder 17.

The wheel 1 is pivoted to the shaft supporting portion 2 which is provided at a distal end of the swing arm 4, which is further pivoted to a certain position (not shown) of the base wheel at a shaft-supporting portion 4a.

At a certain location on the base wheel which is located in a vertical position above the shaft supporting portion 4a of the swing arm 4, a pivot axis portion 18 of the bell crank 12a is pivoted.

An oil pressure expandable lifting actuator 5 having the internal lock R is being provided between one end of the bell crank 12a and the shaft supporting portion 2 of the wheel 1. The coil sprint 17' is provided between the other end of the bell crank 12a and the shaft supporting portion 4a of the swing arm 4 through the washers 9,10. The oil pressure damper 17 is constructed to be supported on a same axis of the coil spring 17'.

With the aforementioned structure, a dropping of the wheel 1 can be achieved by means of extending the lifting actuator 5. When the swing arm 4 swings and drops around the shaft supporting portion 4a as its swinging center to a certain position, the internal lock R installed inside the lifting actuator 5 operates to function as a simple rod, as will be described later.

When the wheel is needed to be stored after said internal lock R of the lifting actuator 5 is released to contract the actuator, the swing arm 4 starts to swing up around the shaft supporting portion 4a as a swing center to a certain predetermined position.

By operating the internal lock R of the lifting actuator 5 through dropping the wheel 1, the lifting actuator 5 functions simply as a rod. Hence, the shock on the wheel 1 is transferred to the coil spring 17' between washers 9,10 and to the oil pressure damper 17 through the bell crank 12a to perform an excellent shock absorbing capacity, resulting in a better feeling of comfortable riding.

Embodiment 3

Figure 4:
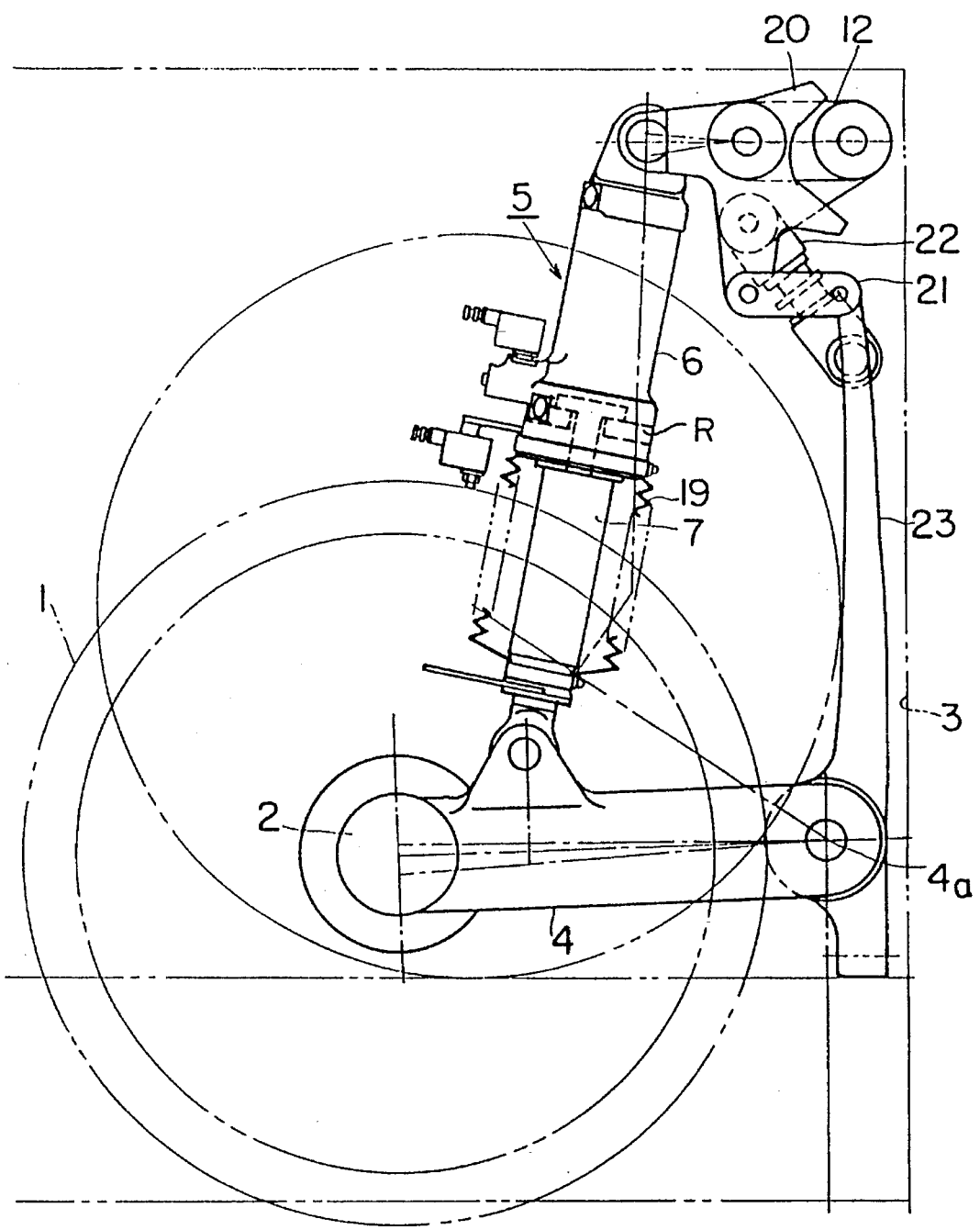
FIG. 4 is an illustration showing a side view of the vehicle according to the third embodiment of the leg apparatus for the magnetically levitated vehicle using a flat spring of the present invention.

In the leg apparatus as seen in FIG. 4, the wheel 1 is designed to be supported and hung by a swing arm 4 in which the shaft supporting portion 2 that is meant to support the wheel 1 is provided at a distal end thereof and is furtherly supported to the supporting wall of the base wheel through a bracket (not shown), by the lifting actuator 5 that is provided through a bell crank 20, by and the lever joint 12 positioned between the shaft supporting potion 2 and the base wheel which is located above said shaft supporting portion 2.

Figure 5A:
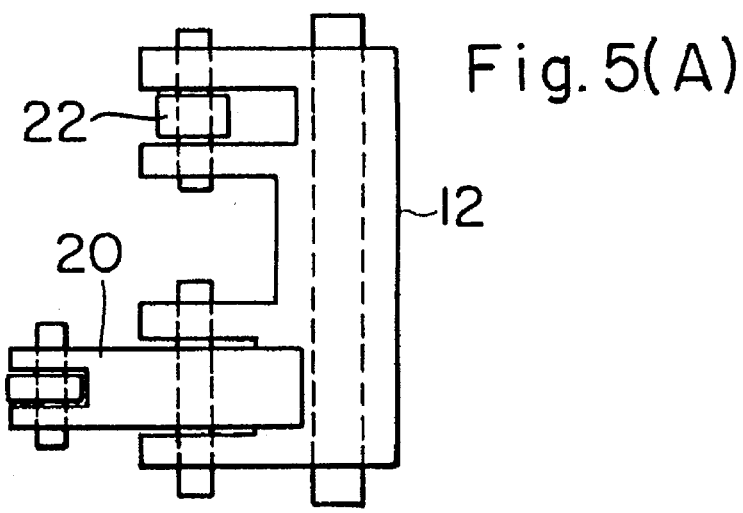
FIG. 5A is an illustration of a bell crank and lever joint that are viewed from the top side according to the third embodiment of the leg apparatus for the magnetically levitated vehicle of the present invention.

Moreover, as seen in FIG. 5A, at the upper end of the lifting actuator 5 (in other words, upper end of the barrel 6), one end of the bell crank 20 which is pivoted to one end of the lever of the lever joint 12 which is being supported axially to the supporting wall on the base wheel 3 side through the bracket (not shown) is pivoted.

On the other end of the bell crank 20, the distal end of a flat spring 23 provided in a direction upwardly and vertically from the shaft supporting portion 4a of the swing arm 4 is connected to a link 21.

Figure 5B:
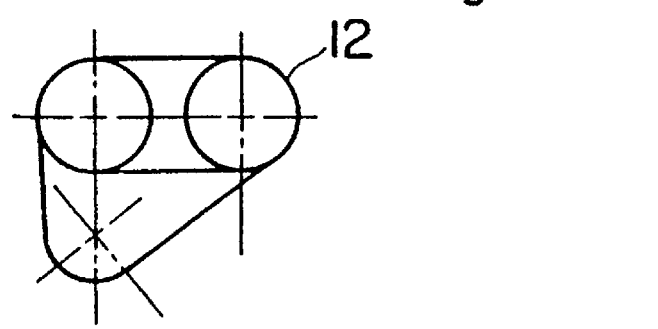
FIGS. 5B and 5C are side views for the lever joint and bell crank, respectively.
Figure 5C:
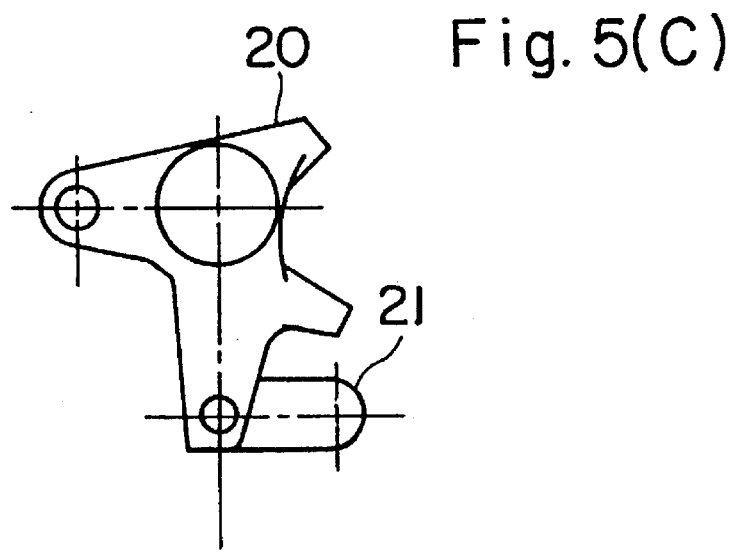

As seen in FIG. 5, on the bell crank 20 a pair of projections is provided besides said lever to control the rotating range by means of contacting the side body of the lever joint 12 while the bell crank is rotating.

Hence the leg apparatus according to this embodiment positions and hangs the wheel 1 by the swing arm 4 and the lifting actuator 5 having the internal lock R to perform a buffer-support by the flat spring 23 located upwardly and vertically from the shaft supporting portion 4a of the swing arm 4.

The lifting actuator 5 is constructed of the oil pressure cylinder having the internal lock R, and a lock pin or lock segment is provided at an engaging distal end of the piston rod 7 which engages into the barrel 6, so that the internal lock R will operate only when the piston rod 7 extends its maximum stroke. Moreover, the outer periphery of the piston rod 7 is protected by means of metallic bellows 19.

To the other end of the lever of the lever joint 12 pivoted to the supporting wall of the base wheel 3 through a bracket (not shown), a vehicle adjustment bolt 22 pivoted to the base wheel 3 is connected.

With the above constructed leg apparatus, the leg can be extended through the action of expanding the piston rod 7 of the lifting actuator 5 by means of supplying pressurized oil to upper side of the barrel 6. Then the internal lock R operates at the maximum extension, as seen in FIG. 4, to complete the leg extension. Reversely, the wheel 1 can be completely stored by releasing the internal lock R done by supplying the pressurized oil to the shaft side and this in turn will act to contract the piston rod 7. Hence the mechanism of lifting up and down the wheel 1 can be achieved easily and securely. Furthermore, the upper end of the barrel which is the top portion of the lifting actuator 5 is supported by the flat spring 23 through the bell crank 20, and the position for the shaft supporting of the bell crank 20 is defined by a rotating movement of the lever joint 12. Its rotation is further determined by pushing the bolt 22 for vehicle height adjustment. Hence only by changing the pushing stroke the position for the supporting height can arbitrarily be changed, so that the vehicle height adjustment can be achieved very easily in this way.

Moreover, the wheel 1 is positioned and hung by means of the swing arm 4 and declined lifting actuator 5 and is buffer-supported by virtue of the flat spring 23 through the bell crank 20, so that the expected shock caused by expanding the wheel is case of changing the cruising speed from a high speed to a low speed can be absorbed by the resilient flat spring 23. Hence an excellent shock absorbing performance and in turn the enhancement of better feeling of riding are achieved.

Embodiment 4

Figure 6:
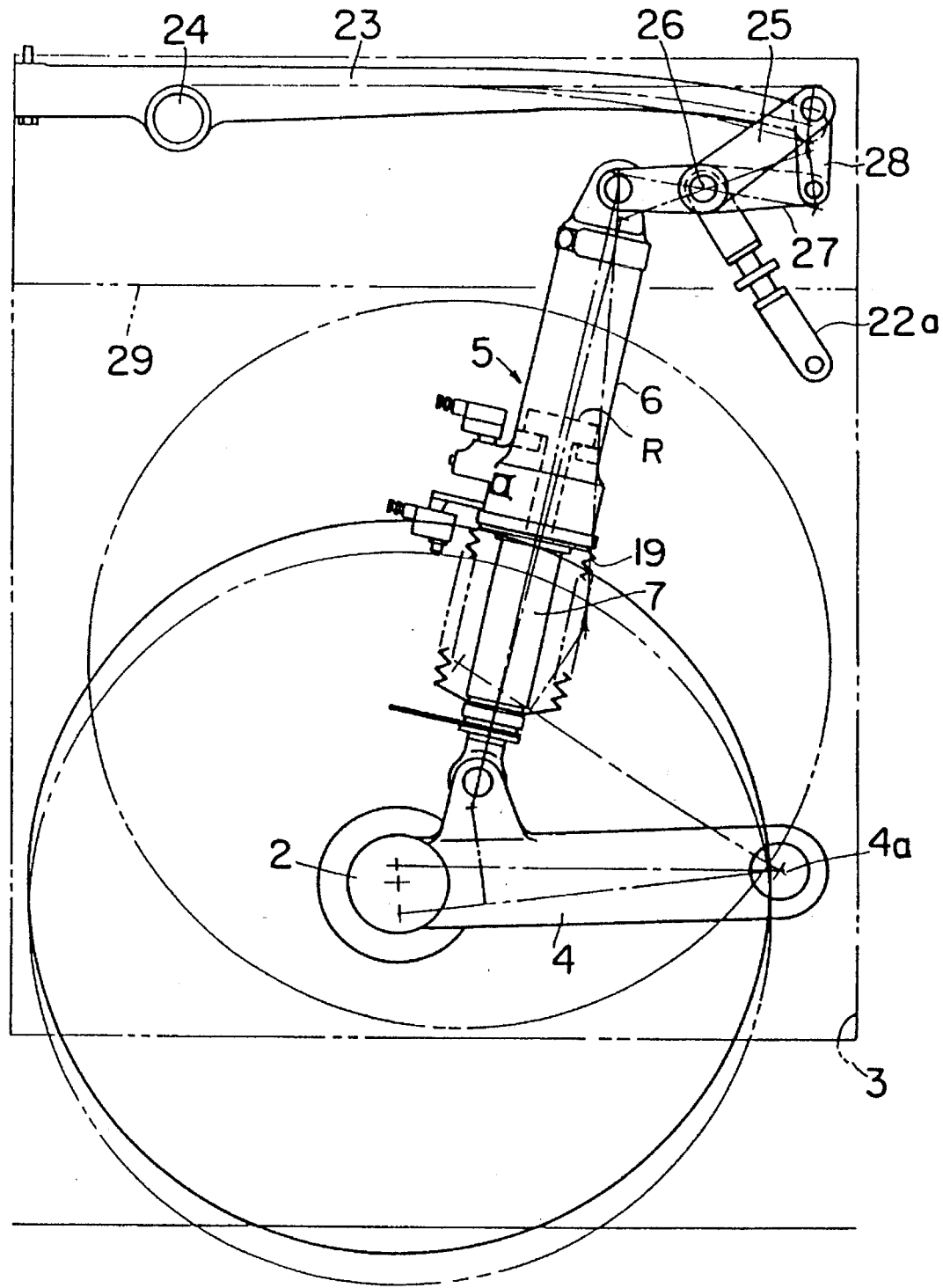
FIG. 6 is an illustration of the side view of the vehicle according to the fourth embodiment of the leg apparatus for the magnetically levitated vehicle designed to be using a flat spring of the present invention.

The leg apparatus seen in FIG. 6 has the wheel 1 pivoted at a distal end of the shaft supporting portion 2. Moreover, while the wheel 1 is hung by the shaft supporting portion 2 by the swing arm which is pivoted to the base wheel 3 through a racket (not shown), the shaft supporting portion 2, and the lifting actuator 5 provided and located between the base wheel above said shaft supporting portion 2; the lever joint 27 which is pivoted at a certex point of a triangle formed by the vehicle height adjustment bolt 22a pivoted to the base wheel 3 and an arm 25 is connected to upper end of the lifting actuator 5 (namely, barrel 6). Furthermore, a distal end of the flat spring 23, which is pivoted to the shaft supporting portion 24 at the upper portion of the base wheel and is located in a horizontal position, is connected to the upper portion of the lifting actuator 5 through a link 28.

Hence, the leg apparatus according to this embodiment positions and hangs the wheel 1 by the swing arm 4 and the lifting actuator 5 having the internal lock R and performs a buffer-support by the flat spring 23 provided in such a position which is upward and horizontal the lifting actuator 5.

Moreover, the lifting actuator 5 is composed of the oil pressure cylinder having the internal lock R, a lock pin or the lock segment is provided at an engaging distal end of the piston rod 7 which engages into the barrel 6, and said internal lock R operates only in the case when the piston rod 7 extends to maximum length. The outer periphery of the piston rod 7 is meant to be protected by the existence of metallic bellows.

By adjusting the length of the vehicle height adjustment bolt 22a pivoted to the base wheel 3, a pivoting position of the lever joint 27 pivoted at upper end of the barrel 6 of the lifting actuator 5 moves in upward or downward positions, so that the vehicle height can be adjusted.

Furthermore, a separating wall 29 is provided on the entire plane which is located below the horizontally installed flat spring 23 except a portion for the lifting actuator 5.

With the leg apparatus described according to this embodiment, the leg can be extended by the action of expanding the piston rod 7 of the lifting actuator 5 through supplying pressurized oil to the upper end of the barrel 6. The leg extension is completed when the internal lock R operates and this occurs when the leg extension reaches its maximum stroke, as shown in FIG. 6. On the other hand, the wheel 1 can completely be stored by releasing the internal lock R through supplying the pressurized oil to the wheel shaft side and this causes to contract the leg. Hence the lifting action of the wheel 1 up or down can be achieved easily and securely.

Moreover, the wheel 1 is positioned and hung by the swing arm 4 and declined lifting actuator 5 and is buffer-supported by the flat spring 23 through the lever joint 27, so that in cases of shock caused by expanding the wheel to change the cruising speed from a high speed to a low speed can be absorbed by resilient flat spring 23. Hence an excellent shock absorbing performance and enhancement of better feeling of riding are achieved.

Embodiment 5

Figure 7:
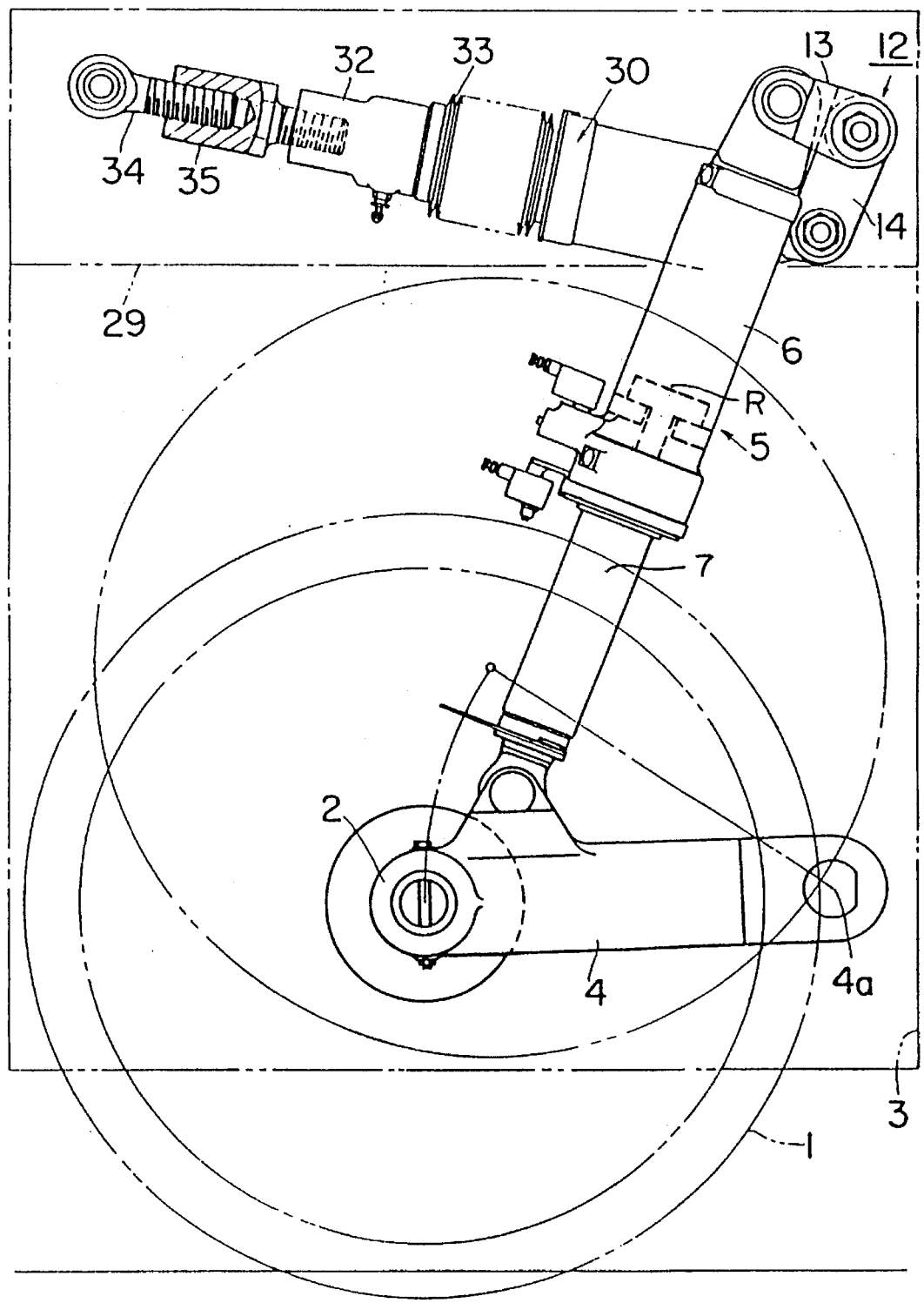
FIG. 7 is a side view of the fifth embodiment of the leg apparatus for the magnetically levitated vehicle using a damper of the present invention.
Figure 8:
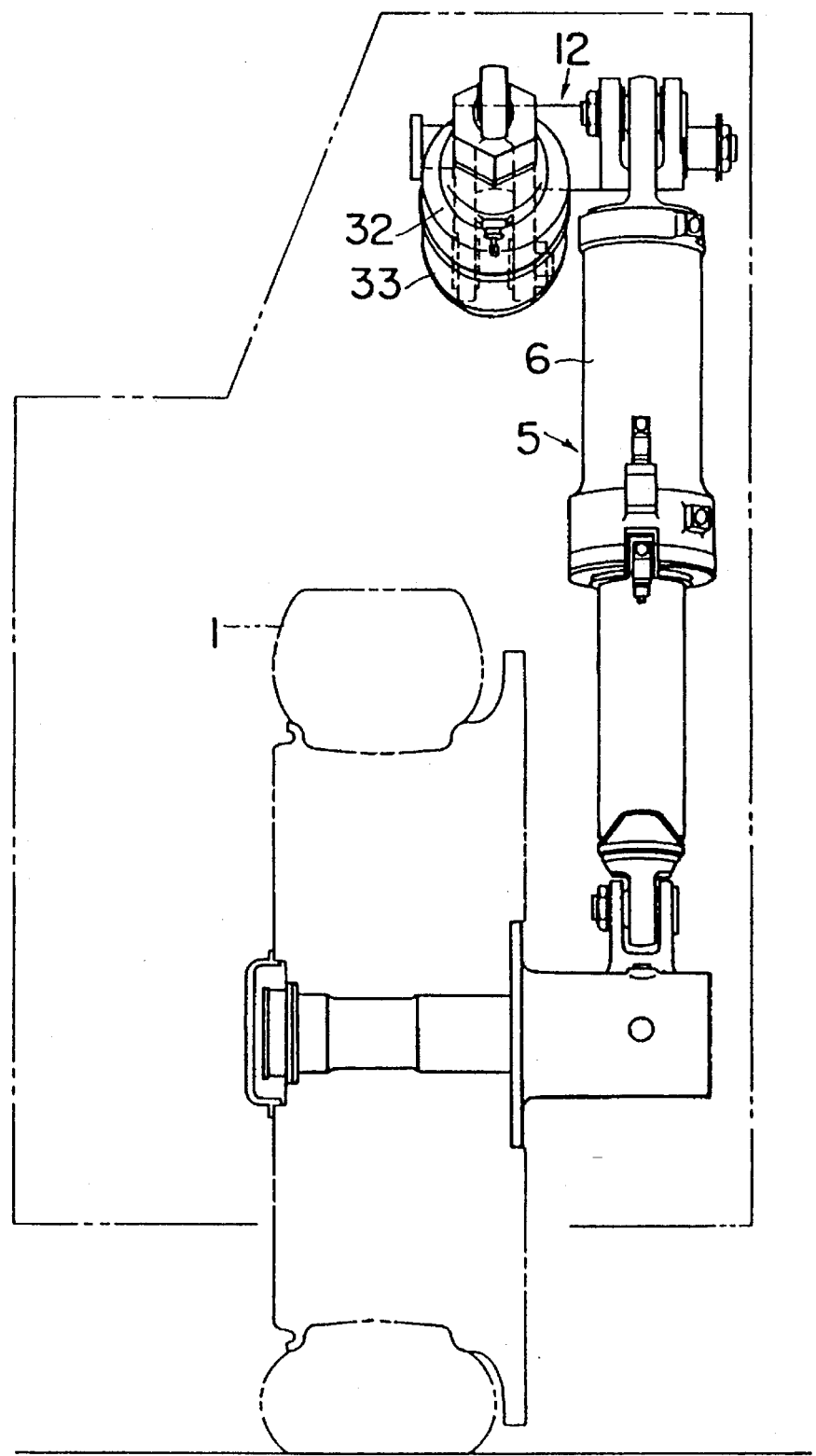
FIG. 8 is a front view of the leg apparatus that is shown in FIG. 7.

With the leg apparatus shown in FIGS. 7 and 8, the shaft supporting potion 2 pivoting the wheel 1 is provided at a distal end, and the wheel 1 is supported and hung by the swing arm 4 pivoted to the supporting wall on the base wheel side 3 through a bracket (not shown), the shaft supporting portion 2, and the lifting actuator 5 provided between the base wheel and said shaft supporting portion through the lever joint 12.

Furthermore, one side of short lever 13 of the lever joint 12, which is pivoted to the supporting wall on the side of base wheel 3 through a bracket (not shown), is axially supported to the upper end of the lifting actuator 5 (namely upper end of the barrel 6).

On the other end of the long lever 14 of said lever joint 12, a damper 30 is connected; said damper is provided at the same level as the lever joint 12, which represent a location in parallel to the swing arm 4 and approximately horizontally.

Hence, the leg apparatus positions and hangs the wheel 1 by the swing arm 4 and the lifting actuator 5 having the internal lock R. It also performs as a buffer-support the damper 30 which provided almost horizontally with respect to other end of the lever joint 12 connecting to the lifting actuator 5 which is pivoted to the base wheel 3 through a bracket (not shown).

Furthermore, the lifting actuator 5 is composed of the coil pressure cylinder having the internal lock R, and the lock pin and lock segment are installed at the distal end of the piston rod 7 which engages into the barrel 6; so that the internal lock R is designed to operate when the piston rod 7 extends its maximum stroke.

For detailed structure of the damper 30 which is provided approximately horizontally, a supporting bolt 34 pivoted to the supporting wall on the side of base wheel 3 in an opposite side of the lever joint 12 is screwed to a nut component 35 for the vehicle height adjustment which is threaded and screwed to a distal end of rod 32 in the damper 30. Hence the compressive force can be adjusted by means of screwing said nut component 35 either by forward or backward movements. Therefore the upper end position of the lifting actuator 5 which is buffer-supported through the lever joint 12 can be changed according to a rotating angle of the lever joint 12. As a result, the supporting height position of the lifting actuator 5 can be arbitrarily changed only by changing the length of the damper 30 through a forward or backward screwing of the nut component 35. Therefore the vehicle height can be adjusted very easily.

Moreover, the separating wall 29 is provided on an entire plane which is locked below the nearly horizontally installed damper 30 except a portion for the lifting actuator 5.

With the leg apparatus constructed in the above, according to this embodiment, the leg is expanded by the action of extending the piston rod 7 of the lifting actuator 5 through supplying the pressurized oil to the upper end side of the barrel 6; so that the internal lock R operates when the leg expands its maximum length, as seen in FIG. 7, to complete the leg extension operation. Reversely, the wheel 1 can be completely stored by releasing the internal lock R which is done by supplying the pressurized oil to the wheel shaft side to contract the piston rod 7. Hence, lifting the leg upward or downward can be achieved easily and securely.

Moreover, the wheel 1 is positioned and hung by the swing arm 4 and declined lifting actuator 5 and is buffer-supported by the damper 30 through the lever joint 12, so that any expected shock that might be caused by expanding the wheel to change the cruising speed from a high speed to a low speed can be absorbed by resilient flat spring 23. Hence an excellent shock absorbing performance and enhancement of better feeling of riding arm achieved.

Embodiment 6

Figure 9:
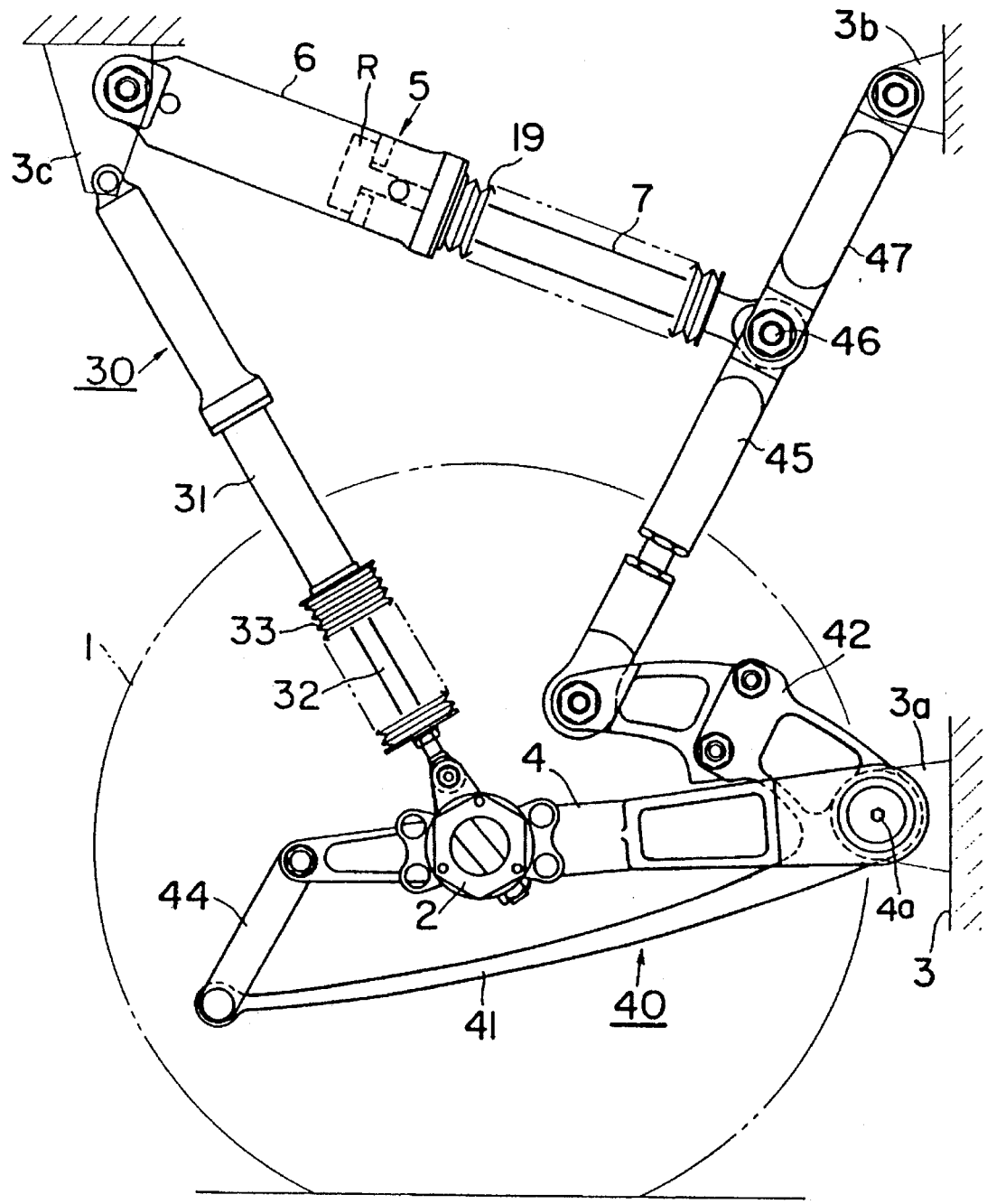
FIG. 9 is an illustration showing a side view of the vehicle according to the sixth embodiment of the leg apparatus for the magnetically levitated vehicle using a bell crank hanging components comprising a flat spring on one end and an arm on other end.
Figure 10:
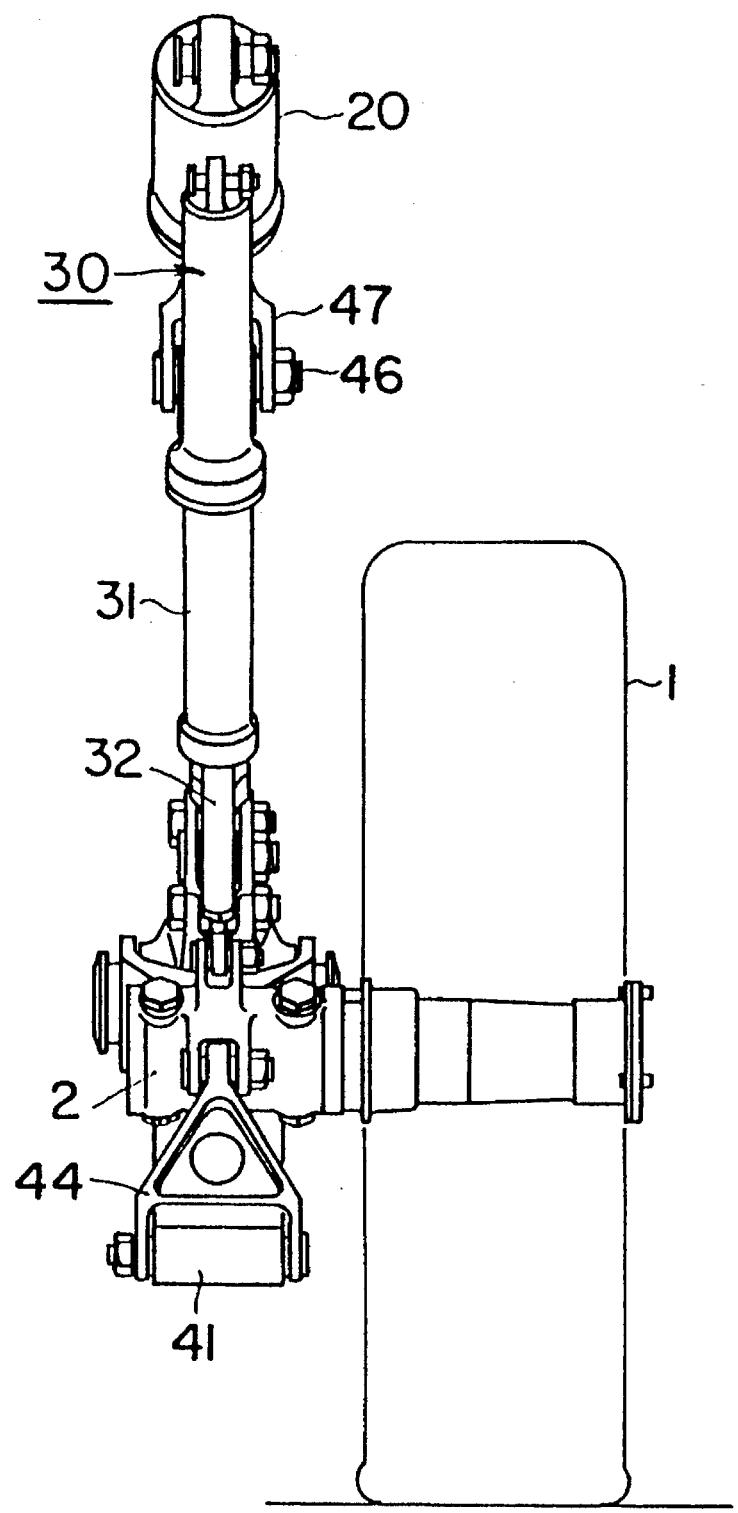
FIG. 10 is a back view of the vehicle of the leg apparatus for the magnetically levitated vehicle shown in FIG. 9.

The leg apparatus shown in FIGS. 9 and 10 is constructed to have a bell crank shaped hanging component 40 to be installed to the shaft supporting portion 2 of the wheel 1, the swing arm 4, upper and lower link arm 47, 45, the lifting actuator 5 and the damper 30.

Said bell crank shaped hanging component 40 is pivoted in such a way that it operates only at the shaft supporting portion 4a with a flat spring 41 and a lifting lever 42 in such a way that it moves only when said lifting lever 42 moves. Furthermore the shaft supporting portion 4a is fixed to the base wheel 3 through a bracket 3a.

Furthermore, the swing arm 4 is also pivoted to the shaft supporting portion 4a. The distal end area of said swing arm 4 is connected to the shaft supporting portion 2 to pivot the shaft of the wheel 1.

The distal end of the flat spring 41 is connected to the shaft supporting portion 2 through a link arm 44, and the wheel 1 is hung by the flat spring 41 and the swing arm 4.

Moreover, the shaft supporting portion 2 is hung by the damper 30 also. The distal end of the piston rod 32 of the damper is provided to the shaft supporting portion 2, and a cylinder portion 31 is pivoted to the base wheel through a bracket 3c.

The lower link arm 45 is pivoted at the distal end of the lifting lever 42 of the bell crank shaped hanging component 40, and is pivotally connected to the upper link arm 47 which is supported in an axial position to the base wheel through the pivot portion of a bracket 3b.

At a pivot portion 46 for the upper and lower link arms 47, 45 the lifting actuator 5 having the interna lock R, which is axially supported to the base wheel through the bracket 3c, is pivotally connected.

With the aforementioned structure of the leg apparatus of this embodiment, the wheel 1 being hung at the distal end of the flat spring 41 through the link arm 44 is being allowed to move through the lifting lever 42 and lower link arm 45 along the pivot portion 46 as its fulcrum by operating the lifting actuator 5. Hence the wheel 1 in such a manner can be lifted easily and securely.

When the actuator 5 drops the wheels 1 to a certain predetermined position, the internal lock R operates to lock the lifting lever 42, so that the wheel shaft supporting portion 2 can be hung at a distal end of the flat spring 41.

Consequently, while the lifting actuator 5 is extending, both the upper and lower ink arms 47,45 and the lifting actuator 5 are fixed in a T-shaped manner, so that high load can be sustained by the action of an axial force of the upper and lower link arms 47,45.

While the lifting actuator 5 is contracting itself, both the upper and lower link arms 47,45 are bent at the pivot portion 46, so that the wheel 1 can be lifted up easily with a short stroke.

Moreover, by hanging the wheel shaft by the lifting actuator 5 and the swing arm 4 and installing the damper 30, shock that is subjected to occur by the wheel when the cruising speed is changed from a high speed to a low one can be absorbed by the flat spring 41, followed by the damper 30. Hence the frictional force on the damper 30 while it is being operated can be minimized, so that excellent shock absorbing capability and better comfortable feeling of riding can be enhanced.

Furthermore, the flat spring 41 is supported in an axial direction to the wheel shaft supporting portion 2 through the link arm 44 having a spherical bearing. Hence a positioning of the wheel shaft, namely a twisting force that take place due to the off-setting between the flat spring 41 serving a supporting fulcrum and a ground contact point of the wheel 1 serving a loading center, and axial force and twist deformation while cruising can be removed within the leg apparatus and this in turn act to minimize their adverse effect on the wheel main body.

Since the lifting actuator 5, the flat spring 41 and the link arm 45 are utilized in the main hanging body in the leg apparatus of this embodiment, it is preferable to select titanium for the flat spring 41 and aluminum alloys for other structural components under considerations for cases when the leg apparatus is used under a strong magnetic field and when the apparatus is needed to be of light weight.

If the leg apparatus is constructed by only the conventional oil/air type buffer device, in cases when the sliding force of the piston rod of the damper is subjected to damage by foreign obstacles. It will immediately affect the buffer absorbing performance. However, since the flat spring 41 is employed in this embodiment, even when the foreign obstacles is involved, it would not affect adversely the shock absorbing capability; hence the reliability on the leg apparatus is enhanced.

Moreover, to the lifting actuator 5 and damper 30 which are utilized in this embodiment, metal bellows 19,33 which can shield in operating range of the piston rods 7,32 are being installed between the distal end of piston rods 7,32 and cylinders 6,31 in order to protect the functional components such as piston rods or the like. Conventional type of cloth boot exhibits a number of drawbacks including the expected deterioration due to weather factors or damage of the aforementioned functional components due to foreign obstacles. However with the leg apparatus mentioned according to this embodiment, these drawbacks had been avoided to offer a high reliability on the leg apparatus.

Figure 11:
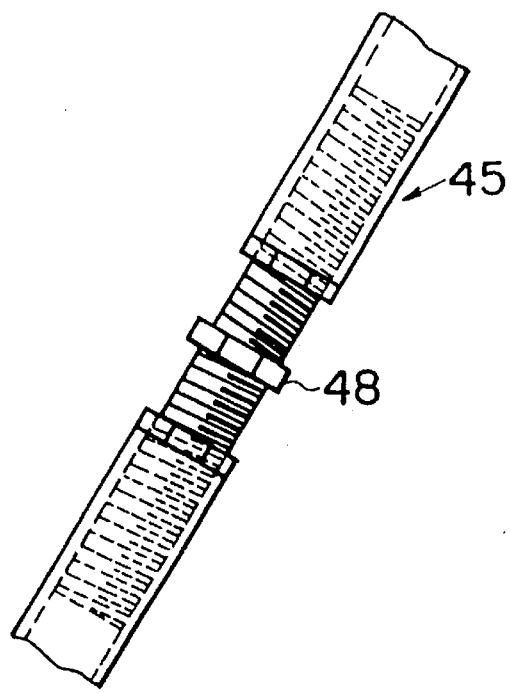
FIG. 11 is an illustration showing a mechanical arm length adjustment mechanism having a lever link arm of FIG. 9.

In the leg apparatus of this embodiment, as seen in FIG. 11, mechanical arm length adjustment mechanism is provided at the lower link arm 45 to adjust the vehicle height.

Namely, the lower link arm 45 is divided into two components and an end portion all of which are threaded. An adjustment bolt 48 is being installed and located between two divided components and screwed to the respective arm. Both sides of the adjustment bolt 48 are threaded with opposite pitch to each other.

The lower link arm 45 connected to the distal end of the lifting lever 42 of the bell crank shaped hanging component 40 is pivotally connected to the upper link arm 47 which is supported in an axial position to the base wheel, and the lifting actuator 5. The length of the lower link arm 45 can be adjusted simply by rotating the adjustment bolt 48 to a certain direction, so that the vehicle height adjustment can be achieved easily when the leg is extending.

Figure 12:
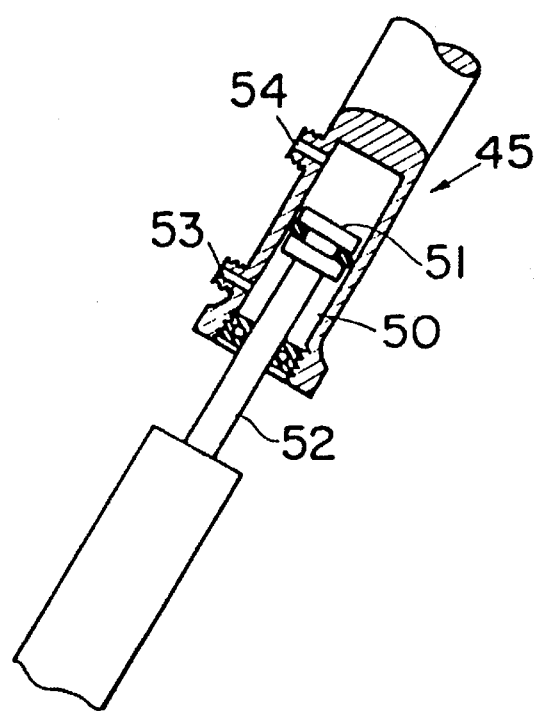
FIG. 12 is an illustration showing an oil pressure type arm length adjustment mechanism using a lower link arm of the sixth embodiment.

The lower link arm 47 illustrated in FIG. 12 is constructed with an oil pressure type arm length adjustment mechanism in order to control the vehicle height.

Namely the lower link arm 45 is divided into two components. The upper portion of the arm is constructed as a cylinder barrel 50, and the distal end of the lower portion is constructed as a piston head 51 and a piston rod 52 and is engaged to the cylinder barrel 50. Hence one side rod has a dual movement cylinder function.

By changing the supplying quantity of pressurized oil to two ports 53,54 which are connected to the cylinder barrel 50, a projecting length of the piston rod 52 can be changed to adjust the length of the lower links arm 45. Hence the vehicle height can be achieved easily in cases when the leg is expanding.

With the leg apparatus shown in FIGS. 9 and 10, the bell crank shaped hanging component which is composed of the flat spring on one side and the lever on the other side is provided to the base wheel. The wheel shaft is positioned to be hanging by means of using the said flat spring and the link arm, and the damper is installed. Hence, the wheel being hung at the distal end of the flat spring by the lifting actuator having the internal lock R can be lifted up and down and fixed easily and securely. Furthermore, the frictional force that is generated on the damper can be minimized by adopting the flat spring, so that excellent shock absorbing action can be achieved and better comfortable feeling of riding is enhanced.

To the distal end of the lifting actuator pivoted by the base wheel, the upper link arm which is axially supported to the base wheel and the lower link arm which is connected to the lifting lever of the bell crank shaped supporting component are pivoted. While the actuator is extending, both upper and lower link arms and the actuator are fixed in a T-shaped manner, so that the high load can be supported through the action of an axial force maintained by the upper and lower link arms. Moreover, the stroke for the actuator while the later is contracting can be shortened, resulting in enabling the storage space to be of smaller size.

Furthermore, since the flat spring is employed as a main constructive component to achieve a buffering function of the leg apparatus, the whole unit weight can be lighter. Utilizing metallic bellows for protection of piston rods in the lifting actuator or damper can prevent deterioration caused by weather factors and damages of the functional components by the action of foreign obstacles. Hence operational reliability is enhanced.

With the leg apparatus of this embodiment, the arm length adjustment mechanism is provided at the lower link arm to enable the vehicle height to be adjustable. Hence even if the vehicle weight fluctuates, the aforementioned adjustment mechanism can compensate these fluctuations to adjust the optimum height of the vehicle, so that there could not be any problems for passengers to ride on and off the vehicle.

Embodiment 7

Figure 13:
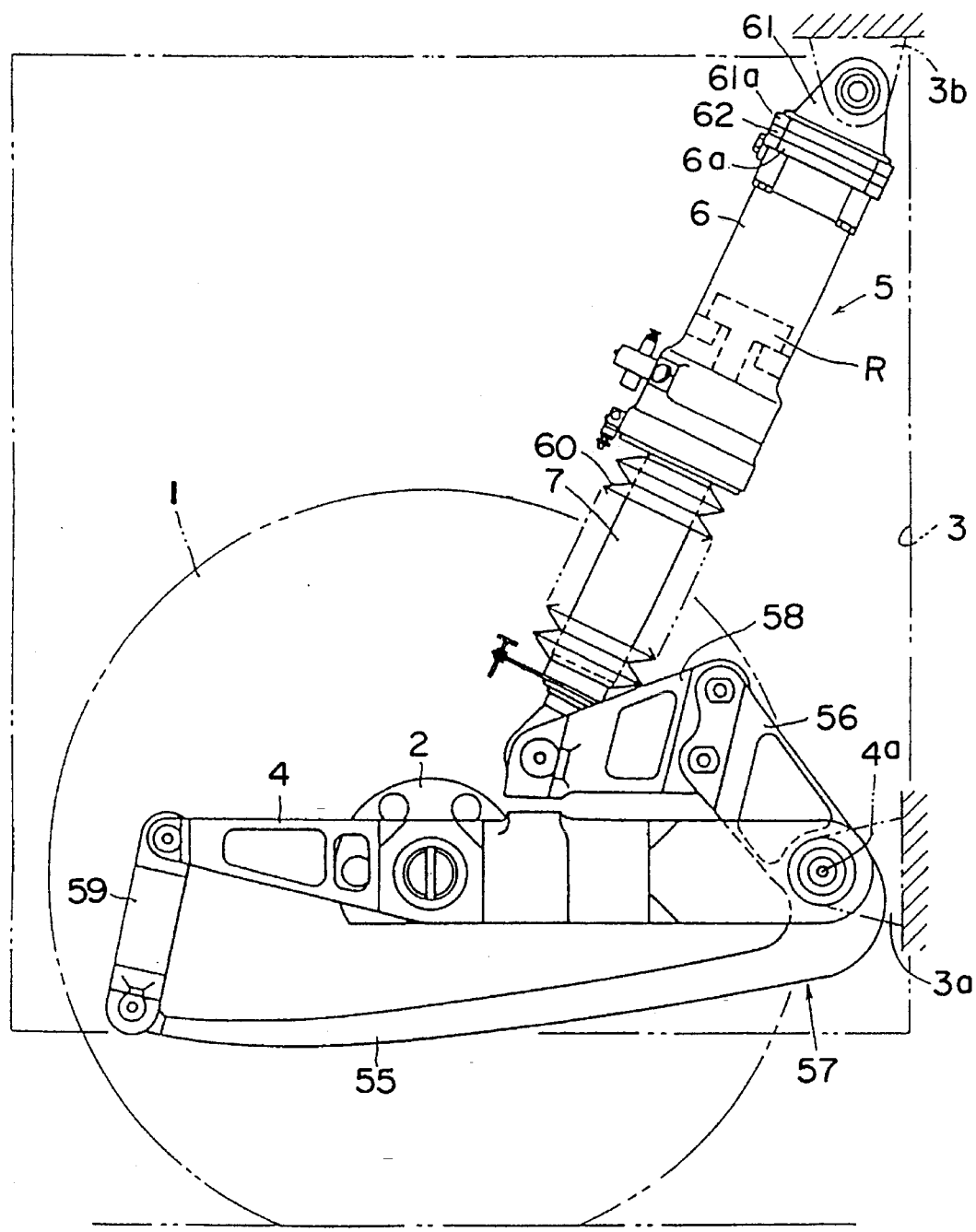
FIG. 13 is a side view of the vehicle according to the seventh embodiment of the leg apparatus for the magnetically levitated vehicle of the present invention.
Figure 14:
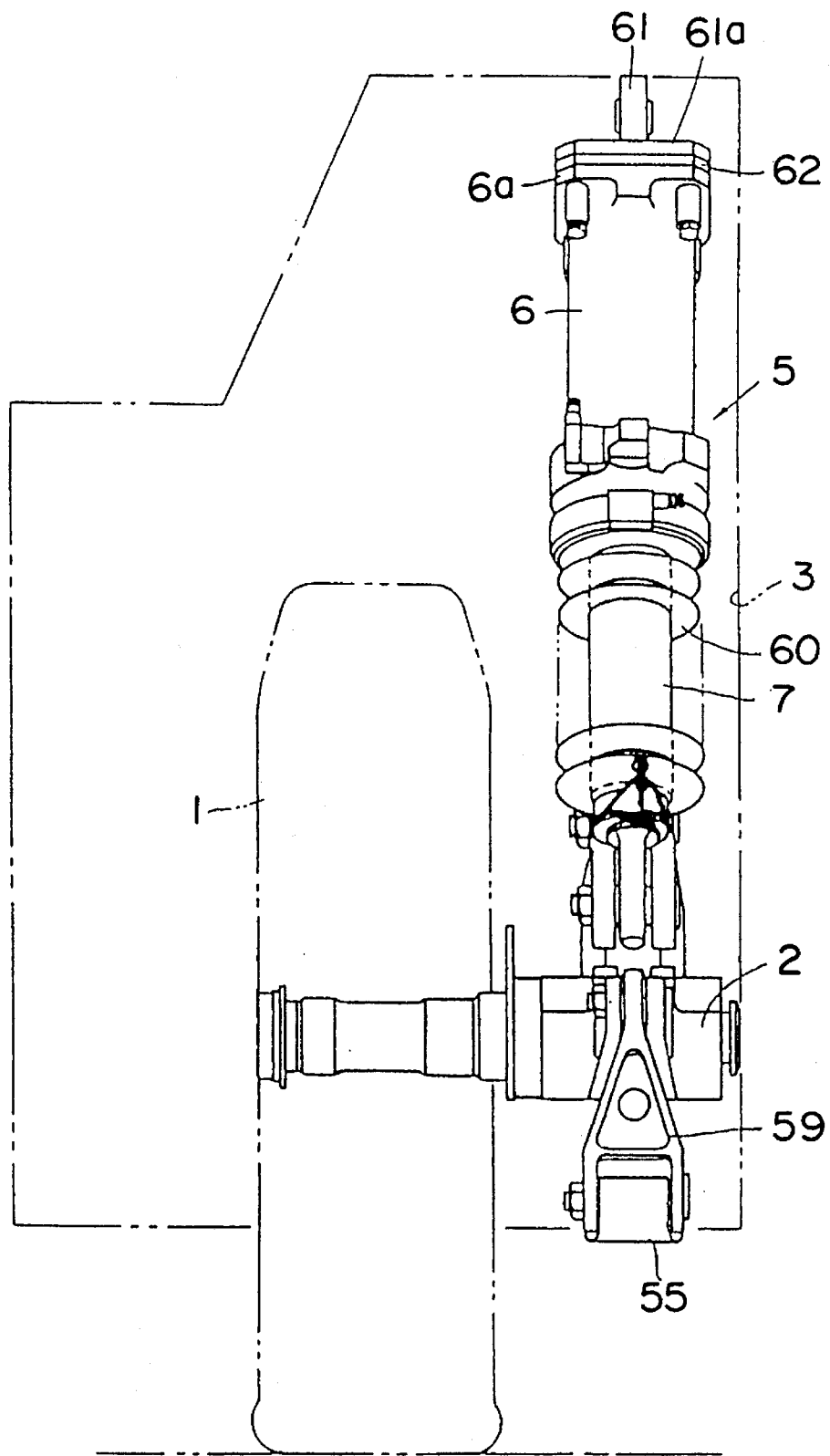
FIG. 14 is a front view according to the seventh embodiment that is a representation of the magnetically levitated vehicle of the present invention.

FIGS. 13 and 14 are illustrations showing the construction of the leg apparatus of this embodiment; FIG. 13 is a side view of the vehicle while FIG. 14 is a front view thereof.

With the leg apparatus according to this embodiment, the shaft supporting portion 2 pivoting the wheel 1 is provided at a central portion. This leg apparatus is furthermore constructed with the swing arm 4 which is in an axial position to be supported by the shaft supporting portion 4a of the bracket 3a to the supporting wall of the base wheel 3, a bell crank shaped hanging component 57 coaxially provided to the shaft supporting portion 4a with the said hanging component 57 being composed of a flat spring 55 on one side thereof and a lifting lever 56 on the other side, and the lifting actuator 5 whose upper end is axially supported to the supporting wall of the base wheel 3 by the bracket 3b and lower end is connected to the lifting lever 56 through a connecting lever 58.

With the leg apparatus of this embodiment, the other end of the swing arm 4 and the other end of the flat spring 55 are pivotally connected at a link arm 59. The wheel 1 supported by the swing arm 4 and the arm are positioned and hung by means of the lifting actuator 5 having the internal lock R through the bell crank-shaped hanging component 57. The wheel 1 is furthermore buffer-supported by the flat spring 55.

The lifting actuator 5 is being composed of the oil pressure cylinder having the internal lock R. The lock pin or lock segment is found to be installed at an engaging distal end portion of the piston rod 7 which engages into the barrel 6. In cases when the piston rod 7 reaches the maximum extension stroke, the internal lock R operates. The piston rod 7 is protected by metallic bellows 60.

The barrel 6 of the lifting actuator 5 is axially supported to the bracket 3b whose upper end is installed to the supporting wall of the base wheel 3. At the upper end portion of the barrel 6, the barrel itself and the shaft supporting portion 61 to axially support the bracket 3b are meant to get separated to form a flange portion 61a. A laminated washer 62, in which washer are stacked to control a desired thickness, is inserted between a flange portion 6a on the main body of the barrel 6 and said flange portion 61. Both flange portions 61a,6a are tightened by the action of the bolts. Hence, the actual length of the lifting actuator 5 can be changed, by altering the thickness of the laminated washers 62, so that with a similar action aiming at changing vertically the upper and position of the shaft supporting portion, the vehicle height is adjustable.

With the aforementioned structures of the leg apparatus according to this embodiment, the leg can be expanded by extending the piston rod 7 of the lifting actuator 5 through the supply of the pressurized oil to the upper end of the barrel 6. When the extension stroke reaches the maximum value, the internal lock R operates, as seen in FIG. 13, to complete the leg extension operation when the swing arm 4 is on horizontal position. On reverse action, by releasing the internal lock R through the supply of the pressurized oil to the wheel shaft side and contracting the piston and 7 the wheel 1 can be completely stored. Hence lifting the wheel 1 up and down can be operated easily and securely. Locking at a storage position is done by an oil pressure device (not shown).

The wheel 1 is positioned and hung by the swing arm 4, and the lifting actuator 5 whose distal end is connected by the link arm 59 to the bell crank shaped hanging component 57 which is composed of the flat spring 55 at one end and the lifting lever 56 at the other end. The vibration that might occur on the spring arm 4 is buffer-supported at the flat spring 55 through the link arm 59. Hence shock generated when the cruising vehicle speed changes form a high speed to a low speed can be absorbed by resilient flat spring 55, resulting in an excellent shock absorbing capacity and enhanced comfortable feeling of riding is attained.

As described in the above, according to the leg apparatus of this embodiment, the wheel 1 is positioned and hung by the swing arm and declined lifting actuator, and is buffer-supported by either combination of coil spring, damper, and flat spring or only the damper. Hence lifting of the wheel up and down can be performed within the stroking range of the lifting actuator, so that the lifting operation is extremely easy and secure. Moreover, the storage space can be minimized in this way. Excellent shock absorbing and better comfortable feeling of riding can also be achieved.

Since the main body of hanging structure for positioning the leg apparatus of this embodiment is the lifting actuator composed of the spring arm and oil pressure cylinder, after taking into accounts the use in the strong magnetic field and the light weight unit, the swing arm or coil spring can be made of titanium and other structural components can be fabricated from aluminum alloys.

Furthermore, because the flat spring and the damper of the buffer device can be provided horizontally above the wheel, an entire plane of the internal area of the storage chamber of the leg apparatus can be separated below the flat spring or damper component, so that if shock resistant and heat resistant separating wall is provided, operational malfunctions might be caused by broken pieces from flat tires, other foreign obstacles or damages of the coil spring due to fire can be avoided and this in turn leads to the enhancement of the reliability of the leg apparatus unit.

According to the leg apparatus of this embodiment, the vehicle height has been done to be adjustable by controlling the rotating angle of the connecting components such as bell crank which supports the upper end portion of the barrel of the lifting actuator. Hence, even if the vehicle weight fluctuates, the optimum vehicle height can be adjusted in correspondence to these fluctuations, so that there would not be any problems for passengers to ride on and off the vehicle. In particular, for a case of one vehicle having four leg apparatus, when the leg apparatus unit is experiencing different loading, it is necessary to maintain the base wheel at a horizontal level. The leg apparatus according to the present invention can achieve this type of maneuver very easily.

While this invention has been described in detail with respect to preferred embodiment and examples, it should be understood that the invention is not limited to that precise embodiments; rather many modifications, and variations would present themselves to those of skill in the art without departing from the scope and spirit of this invention, as defined in the appended claims.

What is claimed is:

1. A leg apparatus for supporting a wheel relative to a magnetically-levitated vehicle defining a wheel base, said leg apparatus comprising:

a support means for said wheel, said support means comprising a swing arm which extends horizontally from a first end pivotally connected to a first bracket mounted on a wall of said wheel base to a second end, said wheel being rotatably mounted to said swing arm between said first and second ends thereof; a bell crank-shaped hanging element pivotally connected to said first bracket, said hanging element including a lifting lever portion and a flat spring portion which extends from said first bracket to a free end near said second end of said swing arm; a link arm connected between said second end of said swing arm and said free end of said flat spring; a lifting actuator connected at a first end to a second bracket mounted on a wall of said wheel base, and a connecting lever connecting a second end of said lifting actuator with said lifting lever portion of said hanging element, such that extension and contraction of said lifting actuator will cause said swing arm to move said wheel from a storage position within said wheel base to an operational position and vice versa.

2. A leg apparatus according to claim 1, wherein said lifting actuator includes an internal lock means for locking said lifting actuator in an extended position.

3. A leg apparatus according to claim 1, wherein said lifting actuator comprises an oil pressure cylinder comprised of a barrel and a piston rod, said piston rod including a portion that extends away from said barrel and a head located in and movable within said barrel, based on oil flow into said barrel.

4. A leg apparatus according to claim 3, wherein said barrel includes a first flange at one end thereof which is pivotally connected to said second bracket, said first flange defining said first end of said lifting actuator, and said piston rod includes a second flange at an end thereof remote from said head end that is pivotally connected to said connecting lever, said second flange defining said second end of said lifting actuator.

* * * * *

UNITED STATES PATENT AND TRADEMARK OFFICE
CERTIFICATE OF CORRECTION

PATENT NO.   : 5,593,175
DATED        : January 14, 1997
INVENTOR(S)  : ODA et al.

It is certified that error appears in the above-indentified patent and that said Letters Patent is hereby corrected as shown below:

In the title page: item [30] should read

--Foreign Application Priority Data

Dec. 17, 1991 [JP] Japan..........3-353805
Feb. 24, 1992 [JP] Japan..........4-73363
Dec. 15, 1992 [JP] Japan..........4-354416
Dec. 15, 1992 [JP] Japan..........4-354417
Mar. 26, 1993 [JP] Japan..........5-92343   --

Signed and Sealed this

Sixth Day of January, 1998

*Attest:*

BRUCE LEHMAN

*Attesting Officer*   Commissioner of Patents and Trademarks